US010670109B2

(12) United States Patent
Chang et al.

(10) Patent No.: US 10,670,109 B2
(45) Date of Patent: Jun. 2, 2020

(54) VERTICAL VIBRATION ISOLATION SYSTEM

(71) Applicant: National Applied Research Laboratories, Taipei (TW)

(72) Inventors: Chia-ming Chang, Taipei (TW); Cho-Yen Yang, Taipei (TW); Shieh-Kung Huang, Taipei (TW); Chen-Hao Hsu, Taipei (TW)

(73) Assignee: NATIONAL APPLIED RESEARCH LABORATORIES, Taipei (TW)

( * ) Notice: Subject to any disclaimer, the term of this patent is extended or adjusted under 35 U.S.C. 154(b) by 0 days.

(21) Appl. No.: 16/266,618

(22) Filed: Feb. 4, 2019

(65) Prior Publication Data

US 2020/0072313 A1  Mar. 5, 2020

(30) Foreign Application Priority Data

Aug. 28, 2018  (TW) .............................. 107130039 A

(51) Int. Cl.
*F16F 15/00* (2006.01)
*F16F 15/04* (2006.01)
*F16F 15/073* (2006.01)

(52) U.S. Cl.
CPC .......... *F16F 15/043* (2013.01); *F16F 15/073* (2013.01); *F16F 2230/0064* (2013.01); *F16F 2232/08* (2013.01); *F16F 2234/06* (2013.01); *F16F 2236/04* (2013.01); *F16F 2238/022* (2013.01)

(58) Field of Classification Search
CPC ............. F16F 1/027; F16F 7/082; F16F 7/104

USPC .............. 52/167.1–167.7; 267/136, 158–160
See application file for complete search history.

(56) References Cited

U.S. PATENT DOCUMENTS

| 1,884,594 | A | * | 10/1932 | Davis | ....................... | B61G 9/10 |
| | | | | | | 213/30 |
| 2,594,665 | A | * | 4/1952 | Lockwood | ............ | F16F 15/073 |
| | | | | | | 267/28 |
| 3,737,155 | A | * | 6/1973 | Karlan | .................... | F16F 1/027 |
| | | | | | | 267/136 |

(Continued)

FOREIGN PATENT DOCUMENTS

CN  102606673 B  10/2013
CN  105179587 B  9/2017

*Primary Examiner* — Christopher P Schwartz
(74) *Attorney, Agent, or Firm* — Muncy, Geissler, Olds & Lowe, P.C.

(57) ABSTRACT

The vertical vibration isolation system of the present invention includes a bearing base, a guide rail assembly and a plurality of buckling elements. The bearing base has an upper platform that can move along a vertical direction. The guide rail assembly surrounds the bearing base and has a plurality of arc-shaped sliding channels. The top portion of each buckling element can move with the upper platform, while the bottom portion of each buckling element is slidably connected to the corresponding arc-shaped sliding channel. The vertical displacement of the upper platform would cause different degrees of buckling of the buckling elements and also induces sliding motion of the bottom portion of the buckling elements along the arc-shaped sliding channels. Accordingly, the vertical vibration isolation system can provide nonlinear restoring force by buckling and sliding mechanisms so as to exhibit vertical vibration isolation effect.

9 Claims, 4 Drawing Sheets

(56) References Cited

U.S. PATENT DOCUMENTS

| | | | | |
|---|---|---|---|---|
| 4,264,094 A * | 4/1981 | White | ............... | B60R 19/36 |
| | | | | 188/371 |
| 4,328,944 A * | 5/1982 | Popper | ............... | F16F 1/26 |
| | | | | 248/571 |
| 4,801,019 A * | 1/1989 | Smolen, Jr. | ............ | B60G 11/00 |
| | | | | 267/149 |
| 7,237,364 B2 * | 7/2007 | Tsai | ............... | E04H 9/023 |
| | | | | 248/638 |
| 7,419,145 B2 * | 9/2008 | Lee | ............... | F16F 7/082 |
| | | | | 213/32 R |
| 8,484,910 B2 * | 7/2013 | Shimoda | ............ | F16F 7/104 |
| | | | | 248/562 |

\* cited by examiner

VERTICAL VIBRATION ISOLATION SYSTEM

CROSS REFERENCE TO RELATED APPLICATION

This application claims the benefits of the Taiwan Patent Application Serial Number 107130039, filed on Aug. 28, 2018, the subject matter of which is incorporated herein by reference.

BACKGROUND OF THE INVENTION

1. Field of the Invention

The present invention relates to a vertical vibration isolation system and, more particularly, to a nonlinear vertical vibration isolation system.

2. Description of Related Art

With the development of process technology and the evolution of equipment, vibration isolation becomes more critical for various production apparatuses in high-tech factory buildings. As vibration may cause yield reduction of products and shutdown of production lines, resulting in significant economic losses, it is imperative to develop related technologies for vibration reduction or vibration isolation to reduce the impact of vibration on production machines or precision instruments. Recently, nonlinear vibration isolation technology has received increasing attentions because nonlinear vibration isolation systems can overcome the constraint of vibration isolation frequency inherent in traditional linear vibration isolation systems so as to achieve a wider frequency isolation region and enhanced isolation effect.

Disclosed in CN 102606673B is a nonlinear vibration isolation system, which includes a set of vertical electromagnetic springs and two sets of horizontal electromagnetic springs. By adjusting the control current, the stiffness of the vertical electromagnetic springs and the stiffness of the horizontal electromagnetic springs can meet a certain proportional relationship to achieve wide frequency range isolation. However, permanent magnets and electromagnets are required by this isolation system and may cause interference with some precision instruments, resulting in limited application. Further, CN 105179587B discloses another nonlinear vibration isolation system which uses vertical supporting beams and a horizontal negative stiffness regulator for vertical vibration isolation to reduce isolation frequency in vertical directions. Although this system exhibits wide range of vibration isolation frequency, it requires complicated structural designs.

In view of drawbacks of the existing nonlinear vibration isolation systems, it is urgent to develop various new structural design concepts to realize the practical application of nonlinear vibration isolation technology.

SUMMARY OF THE INVENTION

An objective of the present invention is to provide a vertical vibration isolation system which can exhibit nonlinear isolation effect by buckling and sliding mechanisms so as to reduce damage on a vibration-isolated object caused by vertical vibration wave.

In accordance with the foregoing objective, the present invention provides a vertical vibration isolation system, which includes: a bearing base, having an upper platform, a motion guide mechanism and a lower fundament, the upper platform being configured for disposing a vibration-isolated object thereon, and the motion guide mechanism being disposed between the upper platform and the lower fundament to permit displacement of the upper platform along a vertical direction with respect to the lower fundament; a guide rail assembly that surrounds the bearing base and has a plurality of arc-shaped sliding channels, each of the arc-shaped sliding channels extending from an inner position upwardly and laterally away from the bearing base to an outer position; and a plurality of buckling elements, each of which has a top portion movable with the upper platform, a bottom portion slidably disposed at a respective one of the arc-shaped sliding channels, and a body portion between the top portion and the bottom portion. When the upper platform moves along the vertical direction with respect to the lower fundament, the top portions of all the buckling elements are brought into movement along the vertical direction synchronously with the upper platform to cause different degrees of buckling deformation in the body portions of the buckling elements. When the buckling elements are forced into a predetermined degree of buckling deformation, the bottom portions of the buckling elements slide to an equilibrium position along the arc-shaped sliding channels.

Accordingly, the vertical vibration isolation system of the present invention can be applied to the vibration isolation of equipment (such as precision instruments or apparatuses) and can provide nonlinear resilience through buckling and sliding mechanisms. Thereby, the vibration of the vibration-isolated object in the vertical direction can be reduced so as to avoid the damages and impacts on the vibration-isolated object caused by vertical vibration wave.

In the present invention, the motion guide mechanism can be any mechanism configured to permit relative displacement of the upper platform in the vertical direction. For instance, in a preferred embodiment of the present invention, by virtue of guide rail design, the upper platform can move with respect to the lower fundament along the vertical direction under external force.

In the present invention, the guide rail assembly is configured to provide sliding curved surfaces along with the bottom portions of the buckling elements can be forced into arc motion. As a result, this system can provide restoring force by sliding mechanism. The guide rail assembly may include a plurality of rail stands, each of which has an arc-shaped sliding channel. Preferably, the rail stands are symmetrically disposed around peripheral edges of the bearing base to ensure symmetric mechanical behavior of the isolation system. For instance, in a preferred embodiment of the present invention, the guide rail assembly consists of four rail stands symmetrically disposed at four sides of the bearing base and having the same design for the arc-shaped sliding channel. Additionally, the arc-shaped sliding channels of the guide rail assembly can be designed to have an arc shape of which slopes vary in an increasing trend from the inner position to the outer position. The curvature and arc length of the arc-shaped sliding channels can be designed according to requirements to achieve desired isolation effect.

In the present invention, the nonlinear isolation effect of the buckling elements is attributed to the buckling behavior of the body portions and the sliding motion of the bottom portions. Preferably, the buckling elements are symmetrically disposed in the isolation system to ensure symmetric mechanical behavior. For instance, in a preferred embodiment of the present invention, the vertical vibration isolation system includes four buckling elements, of which the top portions are symmetrically connected to four sides of the upper platform and the bottom portions are configured as rollers slidably disposed at the four symmetric rail stands. The body portions of the buckling elements can be constructed by stacking a plurality of elastic sheets (such as steel sheets) so as to enhance stiffness of the buckling elements. Preferably, the elastic sheets have different lengths and are superposed in an order from the longest one to the shortest one along a lateral direction directed away from the bearing base, so that the buckling elements can buckle in a predetermined direction under an axial force. Accordingly, when a downward force is applied on the top portions of the buckling elements, the body portions of the buckling elements are deformed to have buckled shape with a concave surface facing in the bearing base.

In the present invention, the phrases "inner position" and "outer position" refer to relative positions in the lateral directions (i.e. the horizontal directions). The nearer position to the bearing base is defined as the inner position, whereas the farther position to the bearing base is defined as the outer position.

In the present invention, the phrase "symmetrically disposed" refers to disposing a plurality of components with a constant angle interval in a circumferential direction. For instance, when four rail stands are symmetrically disposed around the bearing base, two adjacent ones of the rail stands are spaced from each other by 90 degrees in a circumferential direction; when six rail stands are symmetrically disposed around the bearing base, two adjacent ones of the rail stands are spaced from each other by 60 degrees in a circumferential direction. Likewise, when four buckling elements are symmetrically connected to the upper platform, two adjacent ones of the buckling elements are spaced from each other by 90 degrees in a circumferential direction; when six buckling elements are symmetrically connected to the upper platform, two adjacent ones of the buckling elements are spaced from each other by 60 degrees in a circumferential direction.

The foregoing and other objects, advantages, and novel features of the invention will become more apparent from the following detailed description when taken in conjunction with the accompanying drawings.

DETAILED DESCRIPTION OF THE PREFERRED EMBODIMENT

Hereafter, example will be provided to illustrate the embodiments of the present invention. Advantages and effects of the invention will become more apparent from the disclosure of the present invention. It should be noted that these accompanying figures are simplified and illustrative. The quantity, shape and size of components shown in the figures may be modified according to practical conditions, and the arrangement of components may be more complex. Other various aspects also may be practiced or applied in the invention, and various modifications and variations can be made without departing from the spirit of the invention based on various concepts and applications.

Figure 1:
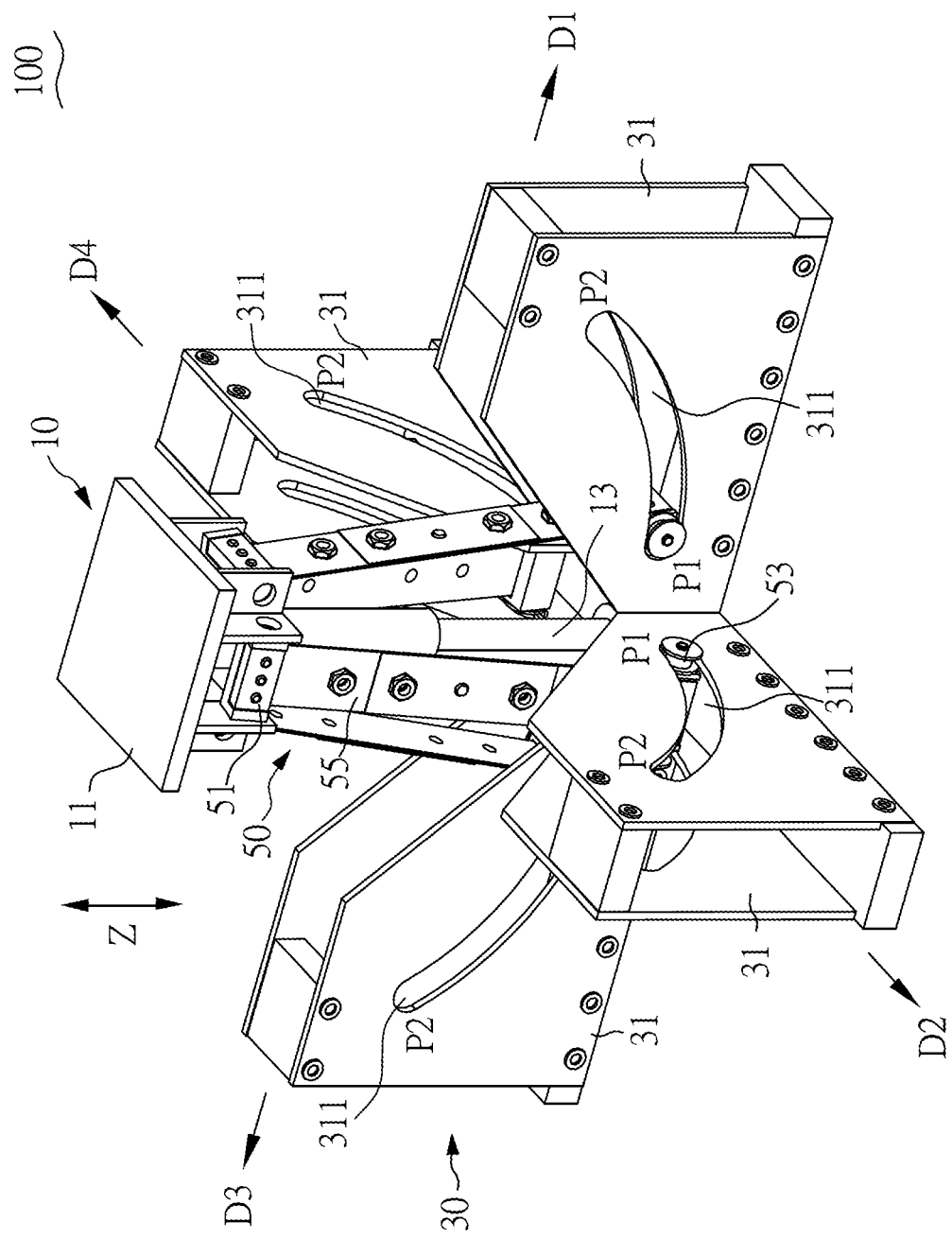
FIG. 1 is a perspective view of a vertical vibration isolation system in accordance with a preferred embodiment of the present invention.

Please refer to FIG. 1, which is a perspective view of a vertical vibration isolation system 100 in accordance with one embodiment of the present invention. The vertical vibration isolation system 100 of this embodiment includes a bearing base 10, a guide rail assembly 30 and four buckling elements 50. The bearing base 10 has an upper platform 11 upward and downward movable in the vertical direction Z. The guide rail assembly 30 surrounds the periphery of the bearing base 10. Each of the buckling elements 20 has a top portion 51 fixed to the bearing base 10 and a bottom portion 53 slidably disposed at its corresponding arc-shaped sliding channel 311 of the guide rail assembly 30. Accordingly, as shown in the side schematic view of FIG. 2 in which the components at the front and rear sides of the bearing base 10 are omitted for showing the entire structure of the bearing base 10, when a vibration-isolated object M is placed on the upper platform 11 of the bearing base 10, the upper platform 11 would move downward under the weight of the vibration-isolated object M and provide downward axial pressure on the top portions 51 of the buckling elements 50. Due to the downward pressure, the buckling elements 50 are forced into bucking deformation, and the bottom portions 53 of the buckling elements 50 would slide upward to an equilibrium position P3 along the arc-shaped sliding channels 311 of the guide rail assembly 30, resulting in dynamic equilibrium. By virtue of buckling and sliding mechanisms, the buckling elements 50 can provide nonlinear restoring force. Accordingly, under external forces (such as earthquakes), the isolation system can reduce the impact on the vibration-isolated object M caused by vertical vibration wave through buckling and sliding mechanisms.

The main components and the association among them of the vertical vibration isolation system 100 in accordance with the present invention are further illustrated as follows. For convenience of description, taking the bearding base 10 in FIG. 1 as a center point, four lateral directions that are perpendicular to each other and directed away from the bearing base 10 (i.e. outward directions) are defined as a first direction D1, a second direction D2, and a third direction D3 and a fourth direction D4, respectively.

Figure 2:
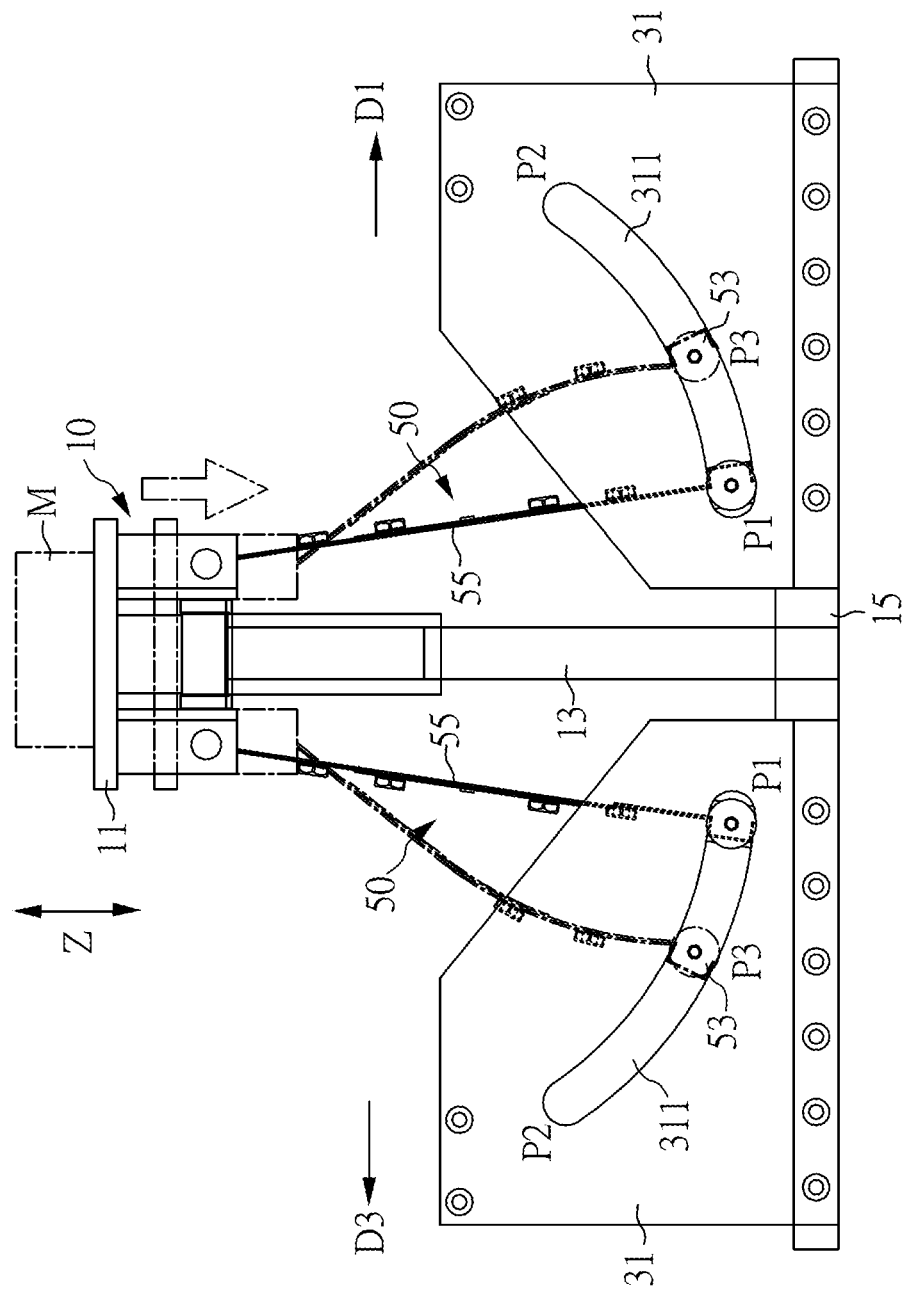
FIG. 2 is a side schematic view of a vertical vibration isolation system in accordance with a preferred embodiment of the present invention.

The bearing base 10 includes an upper platform 11, a motion guide mechanism 13 and a lower fundament 15 (please referring to FIG. 2). The motion guide mechanism 13 is disposed between the upper platform 11 and the lower fundament 15. By guide rail design, the upper platform 11 can move in the vertical direction Z with respect to the lower fundament 15.

The guide rail assembly 30 includes four rail stands 31 symmetrically disposed at four sides (i.e. front side, rear side, left side and right side) of the bearing base 10. Each of the rail stands 31 has an arc-shaped sliding channel 311 which extends from an inner position P1 to an outer position P2 in the upward direction and lateral directions directed away from the bearing base 10 (i.e. the first direction D1, the second direction D2, the third direction D3 and the fourth direction D4). The slopes of the arc shape vary in increasing trend from the inner position P1 to the outer position P2.

The four buckling elements 50 each have a top portion 51, a bottom portion 53 and a body portion 55. The top portions 51 are symmetrically fixed to four sides of the upper platform 11, respectively. The bottom portions 53 are configured as rollers slidably disposed at their corresponding arc-shaped sliding channels 311 of the rail stands 31, respectively. Accordingly, when the upper platform 11 moves along the vertical direction Z with respect to the lower fundament 15, the top portions 51 of all the buckling elements 50 are brought into displacement along the vertical direction Z synchronously with the upper platform 11, resulting in different degrees of buckling deformation in the body portions 55 between the top portions 51 and the bottom portions 53. When the buckling elements 50 are forced into a predetermined degree of buckling deformation, the bottom portions 53 of the buckling elements 50 slide to an equilibrium position along the arc-shaped sliding channels 311, resulting in dynamic equilibrium.

Figure 3:
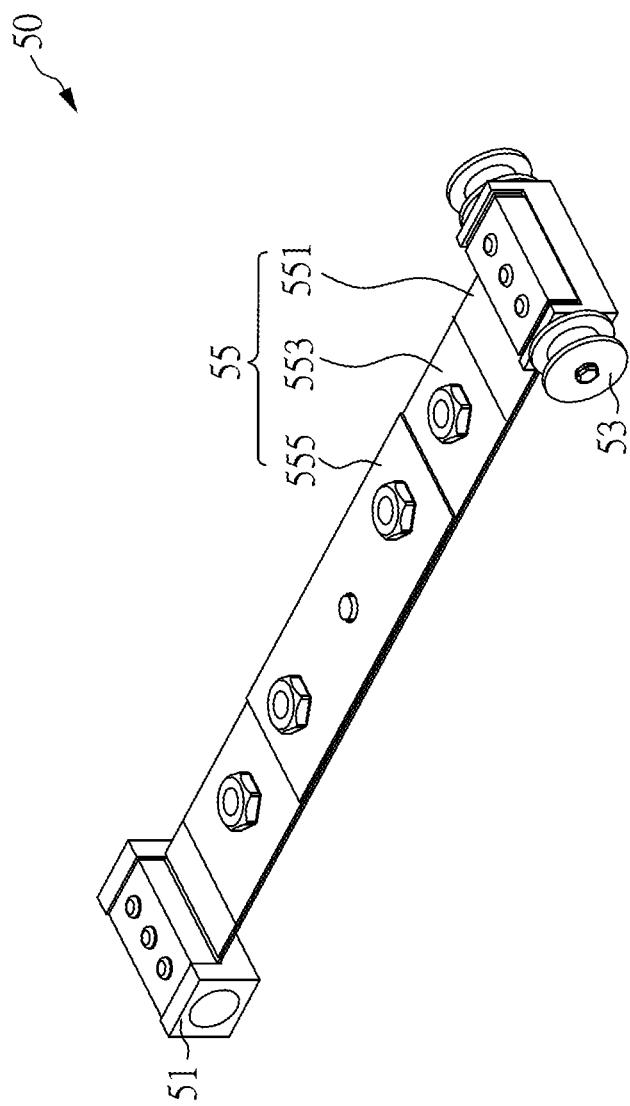
FIG. 3 is a perspective view of a buckling element in accordance with a preferred embodiment of the present invention.
Figure 4:
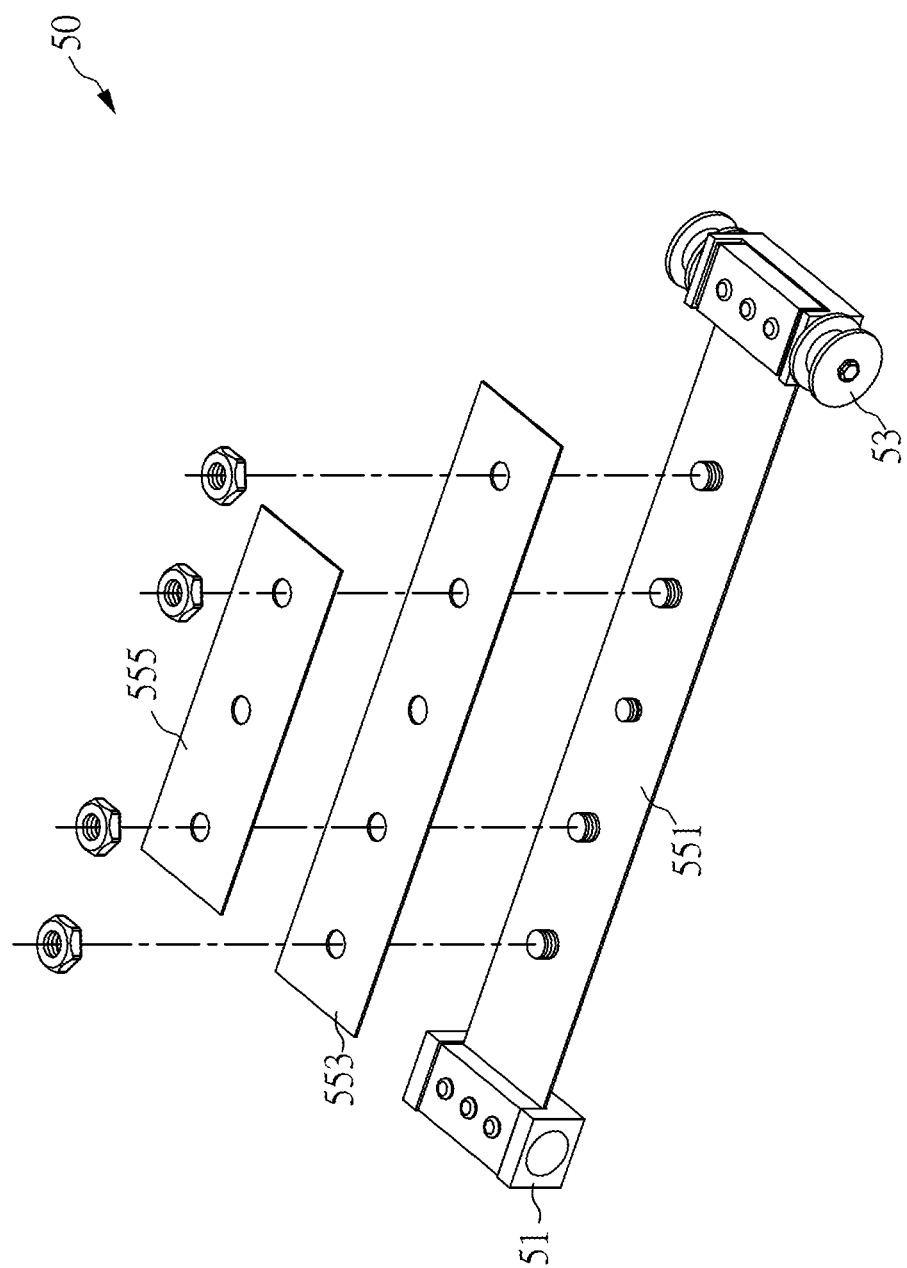
FIG. 4 is an exploded perspective view of a buckling element in accordance with a preferred embodiment of the present invention.

Further, please refer to FIGS. 3 and 4, which are perspective and exploded views, respectively, of the buckling element 50. The body portion 55 of the buckling element 50 has an elongated shape extending from the top portion 51 to the bottom portion 53 and is constructed by stacking a plurality of elastic sheets with different lengths to enhance the stiffness of the body portion 55 and to control the buckling element 50 to buckle in a predetermined direction when subjected to an external axial force. The elastic sheets for the body portion 55 may be steel sheets, but are not limited thereto. Additionally, the quantity and cross-sectional dimension of the elastic sheets are not particularly limited, and can be modified according to practical requirements. In this embodiment, three elastic sheets with the same width and length are used for exemplary illustration, which are a first elastic sheet 551, a second elastic sheet 553 and a third elastic sheet 555. The length of the first elastic sheet 551 is from the top portion 51 to the bottom portion 53. The second elastic sheet 553 is shorter than the first elastic sheet 551, whereas the third elastic sheet 555 is shorter than the second elastic sheet 553. In order to control the buckling element 50 to buckle in a manner of concave facing in the bearing base 10 as shown in FIG. 2 under axial force, the elastic sheets of all the buckling elements 50 are superposed in an order from the longest one to the shortest one along a lateral direction directed away from the bearing base 10 (i.e. the first direction D1, the second direction D2, the third direction D3 and the fourth direction D4). That is, the second elastic sheet 553 is locked to the outer side, facing away from the bearing base 10, of the first elastic sheet 551, whereas the third elastic sheet 555 is locked to the outer side, facing away from the bearing base 10, of the second elastic sheet 553.

In practical application, the quantities of the rail stands 31 and buckling elements 50 are not limited to those illustrated in this embodiment. A person skilled in the art can symmetrically arrange a required quantity of rail stands 31 around the bearing base 10 and a required quantity of buckling elements 50 corresponding to the rail stands 31.

In summary, the vertical vibration isolation system of the present invention can be applied to the vibration isolation of equipment (such as precision instruments or apparatuses) and provide nonlinear resilience through buckling and sliding mechanisms. Thereby, the vibration of the vibration-isolated object in the vertical direction can be reduced so as to avoid the damages on the vibration-isolated object caused by vertical vibration wave.

The above examples are intended for illustrating the embodiments of the subject invention and the technical features thereof, but not for restricting the scope of protection of the subject invention. Many other possible modifications and variations can be made without departing from the spirit and scope of the invention as hereinafter claimed. The scope of the subject invention is based on the claims as appended.

What is claimed is:

1. A vertical vibration isolation system, comprising:
    a bearing base, having an upper platform, a motion guide mechanism and a lower fundament, wherein the upper platform is configured for disposing a vibration-isolated object thereon, and the motion guide mechanism is disposed between the upper platform and the lower fundament to permit displacement of the upper platform along a vertical direction with respect to the lower fundament;
    a guide rail assembly, surrounding the bearing base and having a plurality of arc-shaped sliding channels, wherein each of the arc-shaped sliding channels extends from an inner position upwardly and laterally away from the bearing base to an outer position; and
    a plurality of buckling elements, each having a top portion, a bottom portion and a body portion, wherein (i) the top portions of all the buckling elements are movable with the upper platform, (ii) the bottom portions of all the buckling elements are slidably disposed at the corresponding arc-shaped sliding channels, (iii) when the upper platform moves long the vertical direction with respect to the lower fundament, the top portions of all the buckling elements are brought into movement along the vertical direction with the upper platform to cause different degrees of buckling deformation in the body portions of the buckling elements, and (iv) when the buckling elements are forced into a predetermined degree of buckling deformation, the bottom portions of all the buckling elements slide to an equilibrium position along the arc-shaped sliding channels.

2. The vertical vibration isolation system of claim 1, wherein each of the arc-shaped sliding channels has an arc shape of which slopes vary in an increasing trend from the inner position to the outer position.

3. The vertical vibration isolation system of claim 1, wherein the bottom portions of all the buckling elements are configured as rollers.

4. The vertical vibration isolation system of claim 1, wherein each of the body portions of the buckling elements is deformed to have a buckled shape with a concave surface facing in the bearing base when a downward force is applied on the top portions of the buckling elements.

5. The vertical vibration isolation system of claim 4, wherein each of the body portions of the buckling elements is constructed by stacking a plurality of elastic sheets with different lengths.

6. The vertical vibration isolation system of claim 5, wherein the elastic sheets are superposed in an order from the longest one to the shortest one along a lateral direction directed away from the bearing base.

7. The vertical vibration isolation system of claim 1, wherein the guide rail assembly includes a plurality of rail stands, and each of the rail stands has the arc-shaped sliding channel.

8. The vertical vibration isolation system of claim 7, wherein the rail stands are four rail stands, and the buckling elements are four buckling elements.

9. The vertical vibration isolation system of claim 8, wherein the rail stands are symmetrically disposed at four sides of the bearing base, and the top portions of the buckling elements are symmetrically connected to four sides of the upper platform.

\* \* \* \* \*